United States Patent [19]
Lee et al.

[11] Patent Number: 5,435,865
[45] Date of Patent: Jul. 25, 1995

[54] PROCESS FOR MANUFACTURING AN AUTOMOTIVE TRIM PIECE HAVING A POLYMERIC SKIN MOUNTED TO A SUBSTRATE

[75] Inventors: Shueh-Mo Lee, Downsview; Gerhard Hirmer, Aurora; Earlby E. J. Wakefield, Guelph, all of Canada

[73] Assignee: Decoma International Inc., Concord, Canada

[21] Appl. No.: 92,460

[22] Filed: Jul. 16, 1993

[51] Int. Cl.⁶ .................... B29C 47/02; B32B 31/00
[52] U.S. Cl. .................... 156/85; 156/244.12; 156/244.14; 156/250; 156/256; 156/242; 156/213; 264/342 R
[58] Field of Search ............... 156/242, 244.11, 244.12, 156/244.14, 84, 85, 213, 245, 250, 256; 264/342 R

[56] References Cited

U.S. PATENT DOCUMENTS

| | | |
|---|---|---|
| 3,606,432 | 9/1971 | Honatzis . |
| 4,052,497 | 10/1977 | Monnet . |
| 4,172,745 | 10/1979 | Van Manen ........................ 156/84 |
| 4,174,988 | 11/1979 | Moore et al. ....................... 156/213 |
| 4,291,076 | 9/1981 | Katoh . |
| 4,318,764 | 3/1982 | VanManen . |
| 4,328,273 | 5/1982 | Yackiw . |
| 4,352,772 | 10/1982 | Bezner . |
| 4,478,897 | 10/1984 | Akashi et al. . |
| 5,085,902 | 2/1992 | Yada et al. . |
| 5,240,751 | 8/1993 | Cakmakei . |

FOREIGN PATENT DOCUMENTS

| | | |
|---|---|---|
| 1248927 | 11/1960 | France . |
| 2053627 | 4/1971 | France . |
| 2338783 | 8/1977 | France . |
| 1570816 | 7/1980 | United Kingdom . |
| 9301954 | 2/1993 | WIPO . |

OTHER PUBLICATIONS

Patent Abstract of Japan, vol. 9, No. 252 (M–420)(1975) 9 Oct. 1985 & JP, A 60 104 322 (Shirake Kinzodu Kogyo K.K.) 11 Nov. 1983.
Abstract in English of FR 2053627, DIALOG(R) File 350: Derwent World Pat.(c) 1995 Derwent Info Ltd.

Primary Examiner—Michael W. Ball
Assistant Examiner—Richard Crispino
Attorney, Agent, or Firm—John C. Hunt; Brian W. Gray

[57] ABSTRACT

A process for manufacture of an automotive trim piece having a polymeric skin fastened to substrate. The polymer, for example, polyvinyl chloride has the property that upon cooling to a relatively rigid state the polymer shrinks. The process includes a step of molding the polymeric skin separately from the substrate such that the skin has a rear face for abutment with an obverse face of the substrate and a pair of lips extending from ends of the rear face. The lips are configured for engaging corresponding edges of the substrate. The skin is cooled to a relatively elastic state, and the skin and substrate are assembled while the skin is in the relatively elastic state. On further cooling, shrinkage forces of the skin and the skin lips in abutment with the corresponding edges of the substrate produce a snug fit from edge to edge of the skin to the substrate and the skin becomes relatively rigid.

34 Claims, 5 Drawing Sheets

PROCESS FOR MANUFACTURING AN AUTOMOTIVE TRIM PIECE HAVING A POLYMERIC SKIN MOUNTED TO A SUBSTRATE

FIELD OF THE INVENTION

This invention relates to a process for the manufacture of an automotive trim piece in which there is a skin mounted to a substrate.

BACKGROUND OF THE INVENTION

Co-pending U.S. patent application Ser. No. 021,169, assigned to the assignee of this application and filed on Feb. 22, 1993, the specification of which is incorporated herein by reference, describes a belt molding having a decorative plastic portion and unitarily formed end caps at the ends of the molding. The preferred process described for manufacturing the molding includes a step in which polyvinyl chloride (PVC) is injection-molded onto a substrate having an extruded PVC layer adhesively bonded thereto. As described, however, it is possible to injection-mold directly onto a metal core or substrate treated with a suitable adhesive, a plastic skin and end caps.

During an injection-molding process, as is known to those skilled in the art, a vacuum is applied to the mold cavity to ensure that the cavity becomes entirely filled with the molten material. Such low pressures also induce the flow of material into the cavity, such materials, generally molten polymeric materials being fairly viscous and somewhat resistant to flow. In situations where a high-gloss PVC product is being molded, in which appearance is a consideration, it is important that in-fill of the cavity be relatively complete, else any visible flaw can lead to a rejection of the product.

Either of the injection-molding processes described above in connection with the automotive trim piece, whether or not the substrate includes an extruded plastic layer, is known in the injection-molding arts as an insert molding process. This is because the substrate is inserted into the mold cavity of the molding apparatus to partly define the cavity. It will thus be appreciated, given the conditions in which an injection-molding process takes place, that there is a low tolerance for deviations in the size and shape of the insert part. Improper flow of molten material around the part can lead to a defective part which may or may not be salvageable by trimming. In any case, if a part is rejected both the substrate and injection-molded plastic portion are discarded. In the situation pertaining to the automotive trim piece described above, in which the substrate is already a highly processed part, even prior to the injection-molding step, such wastage is highly undesirable.

It is a practice in the art of injection-molding to use multi-cavity molds where possible. A single molding machine having two or more molding cavities can thus be used to manufacture two or more products in a single injection-molding step, and thereby be utilized more effeciently. As a general rule, there is an inverse relationship between how complicated the shape of part to be injection-molded can be and the number of cavities that can be incorporated into the same mold. The use of an insert in an injection-molding process further complicates the matter in this regard. In the case of the automotive trim piece described in the aforementioned co-pending application, the use of a multi-cavity mold for injection-molding a skin onto a belt molding, by contributing to an increased product rejection rate has lead to a lower than expected increase in the production capacity of a given injection-molding machine.

SUMMARY OF THE INVENTION

In a broad aspect, the present invention is a process for manufacture of an automotive trim piece having a substrate with a polymeric skin fastened to the substrate. The polymer from which the skin is molded has the property that upon cooling to a relatively rigid state the polymer shrinks.

The process includes a step of molding the polymeric skin separately from the substrate from a molten polymer such that the skin has a rear face for abutment with an obverse face of the substrate and a pair of lips extending from ends of the rear face. The lips face each other for location of the substrate therebetween and are shaped for engaging abutment with corresponding edges of the substrate. The process further involves cooling the skin to a non-molten and relatively elastic state. The skin and substrate are then assembled while the skin is in the relatively elastic state. The arrangement is such that the reverse face of the skin and the obverse face of the substrate are in abutting contact and the edges of the substrate are between the lips of the skin with the lips adjacent the corresponding edges of the substrate so that on further cooling of the skin, shrinkage forces of the skin and the skin lips in abutment with the corresponding edges of the substrate produce a snug fit from edge to edge of the skin to the substrate and the skin becomes relatively rigid.

The polymeric skin can be chosen to be an injection molded thermoplastic. Preferably then, cooling of the skin prior to assembly of the skin and substrate is carried out while the skin is in the mold cavity.

Cooling a skin molded from polyvinyl chloride (PVC) to about 50° C. while in its mold is suitable.

A disclosed embodiment is an elongate trim piece and the edges of the substrate are at axial ends thereof.

The process can include preparing the substrate. For example, the substrate can be a metal core for which the polymeric skin is a decorative layer the lips of which are end caps shaped to conceal the core when the molding is installed on a vehicle.

According to a preferred aspect, described further below, the obverse face of the substrate includes a layer of an extruded polymeric material secured to a first area of a metal core. Most preferably, the extruded layer is adhesively secured to the core and the skin is in turn adhesively secured to the extruded layer.

When a trim piece is manufactured according to such a process, the adhesive can be heat activatable and include a step of heating the substrate to activate the adhesive prior to the assembling of the skin and substrate. With the adhesives disclosed herein, heating the substrate to a temperature of about 50° C. prior to assembly of the skin and substrate is suitable.

The process can also include a step of applying pressure to the trim piece to press the abutting faces of the assembled piece, that is of the skin and substrate together to ensure adhesion therebetween.

Lips can be shaped to include a portion directed inwardly of the skin edges to define a channel for receipt of a portion of corresponding edges of the substrate.

According to the disclosed embodiments, an elongate trim piece includes a substrate having first and second pairs of said edges, the first pair being at longitudinal ends of the substrate and the second pair running the length of the substrate. The molding step includes shaping the skin so as to have a first pair of the skin lips corresponding with the first pair of substrate edges and a second pair of said skin lips corresponding with the second pair of substrate edges. Also according to the disclosed embodiments, the substrate includes a metal core and the process includes rollforming the metal to have a generally "U"-shaped cross-section such that the obverse face of the substrate is continuous and is on a first leg of the "U" so as to extend between the first and second pairs of the substrate edges. The skin is shaped to have the reverse face in abutment with the obverse face of the first leg, which may or may not include an extruded thermoplastic layer, as desired.

Most preferrably, a trim piece includes the steps of extruding a thermosetting polymer onto an obverse face of a second leg of the "U", curing the thermosetting polymer, and cutting the substrate to length prior to the assembling step. This arrangment is especially desirable in the instance of the manufacture of a belt molding for installation on the exterior of a vehicle door along a lower edge a window opening in which an obverse face of the skin faces outwardly. The molding step includes injection-molding polyvinyl chloride in a shape to conceal front and rear ends of the first leg of the core from view when the piece is installed on the vehicle door.

In a particular aspect, the present invention is a process for manufacture of a belt molding for installation on the exterior of a vehicle door along a lower edge of a window opening. The process includes rollforming a metal core to have a generally "U"-shaped cross-section for fitting to the car door with a first leg of the "U" facing outwardly. A first activatable adhesive is applied to an obverse face of the first leg for adhesively bonding a thermoplastic polymeric layer thereto. This is followed by activating the adhesive to ready the core for application of the polymeric layer to the first leg and extruding the thermoplastic polymeric layer onto the obverse face of the first leg. An adhesive for bonding a skin of thermoplastic material to the extruded layer is applied to the extruded layer. The core is cut to a predetermined length to form an elongate substrate for the belt molding.

Such a process includes molding a decorative skin of thermoplastic material in a mold separate from the substrate so as to have a rear face for abutment with the extruded thermoplastic polymeric layer of the substrate, and first and second pairs of lips extending rearwardly from the rear face of the skin for location of the substrate therebetween. The lips of the first pair are located at lengthwise, that is axial ends of the skin and each is shaped for engaging abutment with a corresponding end of the substrate. Each lip of the second pair of lips runs from end to end of the skin and each is shaped for engaging abutment with a corresponding edge of the substrate. The skin is cooled while in the mold to a non-molten and relatively elastic state and removed from the mold while the skin is in its relatively elastic state. The skin and substrate are assembled together while the skin is in its relatively elastic state with the reverse face of the skin and the adhesive earlier applied to the extruded layer in contact with each other. Upon further cooling the skin shrinks with respect to the substrate to produce a snug fit of the substrate between the lips of the skin from end to end and from edge to edge of the substrate and the rear face of the skin is adhesively secured to the extruded layer of the substrate.

In disclosed embodiments, the lips are shaped to form a continuous ridge surrounding the rear face of the skin. The first pair of lips is a pair of end caps shaped to conceal the core when the molding is installed on the vehicle while each lip of the second pair is shaped to wrap behind the corresponding edge of the first leg of the core.

DETAILED DESCRIPTION OF A PREFERRED PROCESS

Figure 1:
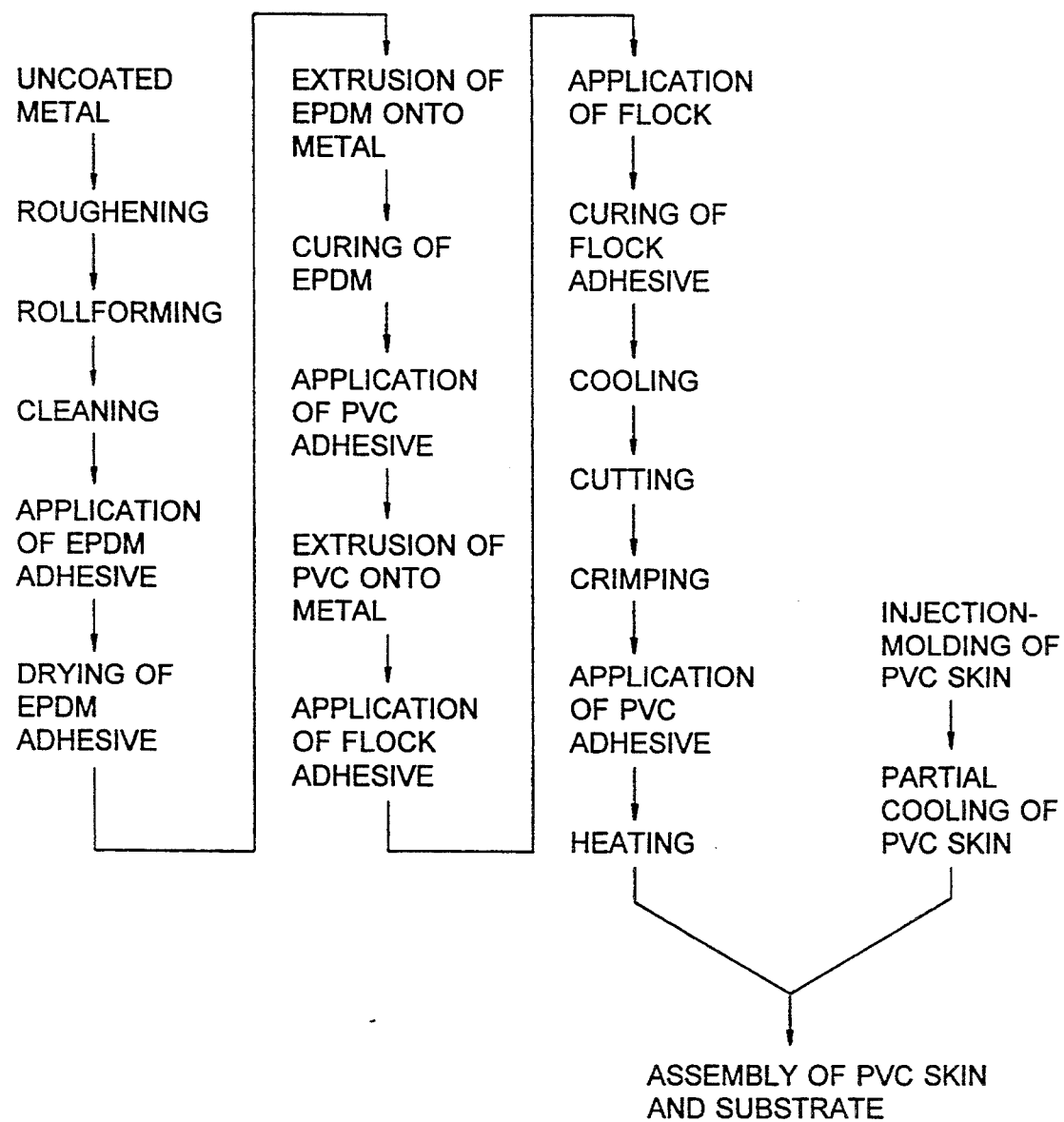
FIG. 1 is a schematic outline of a preferred process of the present invention.

Turning to the drawings, a preferred process is outlined generally in FIG. 1.

An aluminum substrate is cleaned, in preparation for application of the adhesive to be used to bond an EPDM layer thereto as follows. After rollforming, the formed aluminum strip is passed through an enclosed cleaning tank where it is sprayed with warm acid solution. Typically, the solution has a pH of about 1 to 2 and a temperature of anywhere between about 35° and 50° C., the conditions being sufficient to condition the metal for adhesion of later applied adhesives and coatings. The strip is next passed through a second rinse tank wherein it is sprayed with water in order to remove the acid cleaning solution. The metal is then dried with a hot air blast at about 90° C. to 100° C.

To a first area of the cleaned substrate is applied an EPDM primer suitable for bonding EPDM to aluminum, "Chemlok 205" (trademark), a metal primer including a combination of phenolics and chlorinated rubber available from Lord Corporation. This is subsequently heated in an ambient temperature of between about 160° and 180° C. to ready the primer for application of adhesive.

To the primed area is applied an EPDM adhesive suitable for bonding EPDM to the primer, "Chemlok 250" (trademark), a heat-activatable polyisocyanate based adhesive also available from the Lord Corporation. This is heated to give a surface temperature of about 120° C., the adhesive thereby being activated and ready for application of EPDM.

EPDM compound, available as Thona E3402D is then extruded in molten form onto the metal substrate so as to apply the EPDM to the area of the substrate covered by the activated adhesive.

The piece is then passed through an oven at a temperature between about 280° and 300° C. and a residence time of about 1 and a half minutes to cure the EPDM activate the PVC adhesive.

Upon exit from the oven, while the piece is warm, a PVC adhesive known as A1617B, a heat activatable pigmented, modified acrylic adhesive available from B.F. Goodrich, for bonding PVC to aluminum is applied to a second area of the aluminum strip.

PVC is extruded in molten form onto the substrate so as to apply the PVC to the area of the substrate to which the PVC adhesive is applied.

Flock adhesive known as "Flocklok 852" (trademark) containing between about 2 and 4 percent of the catalyst "Chemglaze 9988" (trademark) is applied to the desired region of the EPDM as known to those skilled in the art, and the flock adhesive cured at about 190° C., this taking about four minutes. Flock, a material which presents a low friction surface to a glass window which it abuts, is then applied.

The aluminum core with extruded layers secured thereto is then cut to length and crimped. To the surface of the extruded PVC is applied a PVC adhesive known as A 1404 B.

Figure 2:
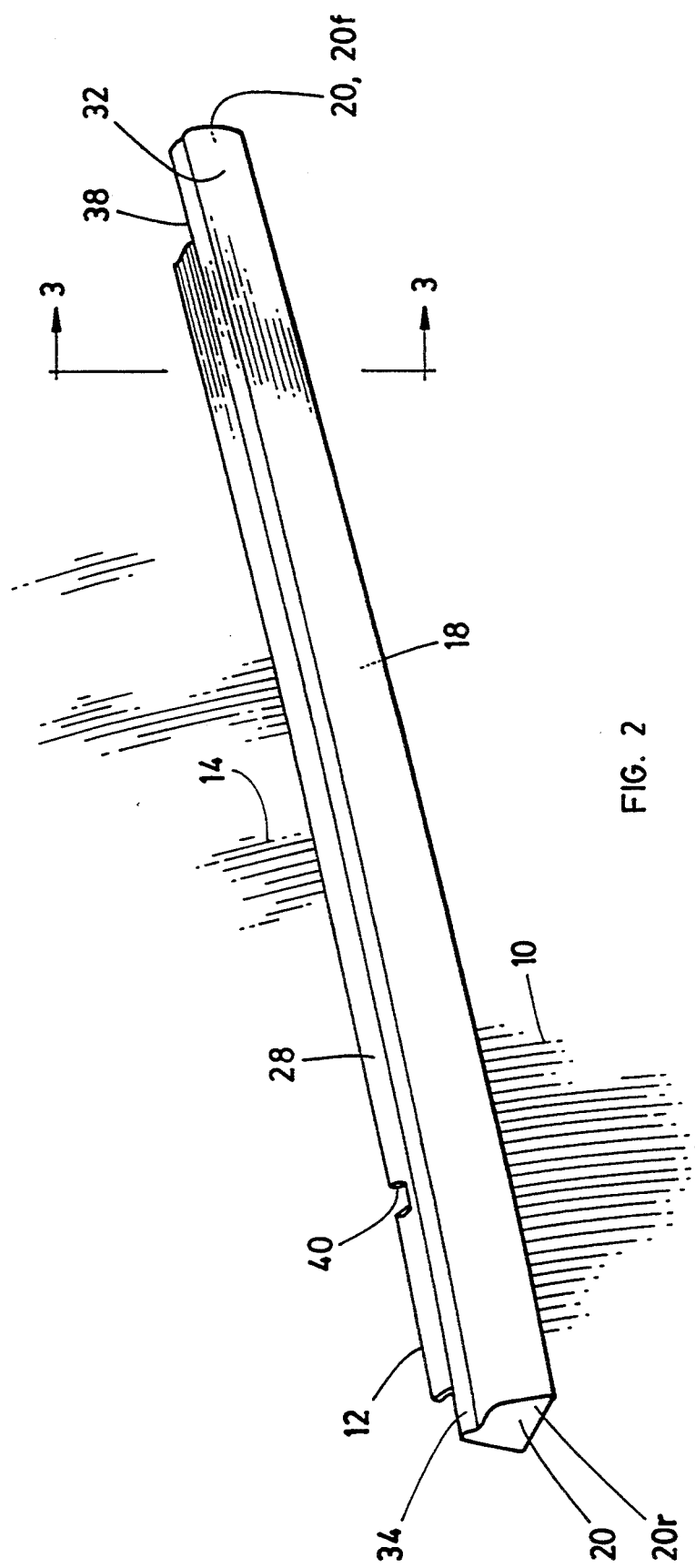
FIG. 2 shows a first embodiment belt molding installed on a driver's side door obtainable by the preferred process of the present invention.
Figure 3:
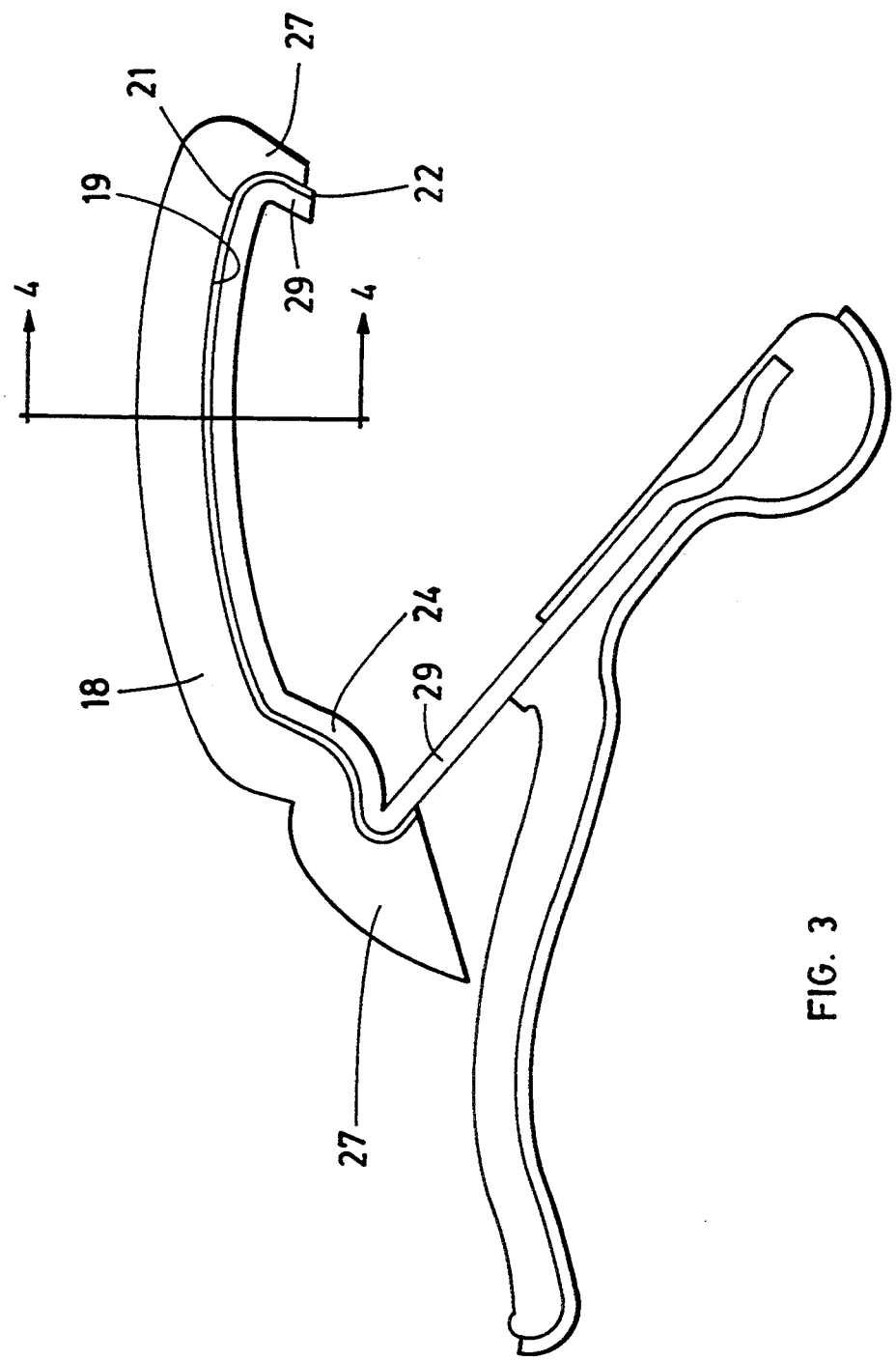
FIG. 3 shows a cross-sectional view of the FIG. 2 embodiment taken along 3—3 of FIG. 2.
Figure 4:
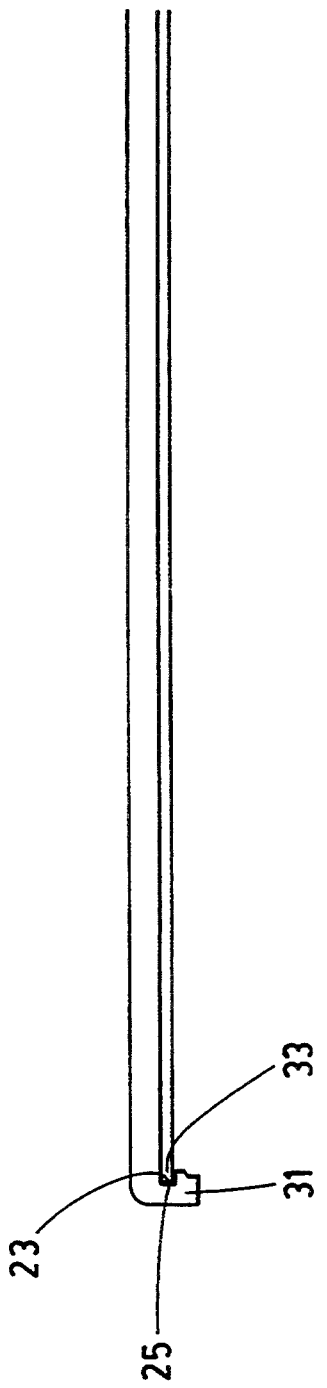
FIG. 4 shows a longitudinal section of the FIG. 2 embodiment taken along 4—4 of FIG. 3 and showing one end of a belt molding having an alternate end cap.

The cover or skin is separately molded to the shape shown in FIGS. 2 to 4 from polyvinyl chloride. The PVC is generally injected in molten form at about 150° C. The skin is cooled while in the cavity of the mold, removed when at a temperature of about 50° C. and, before further significant cooling, assembled with the substrate prepared as described above and which substrate has been heated to a temperature of about 50° C. In assembling the substrate and skin, edges of the skin are stretched over corresponding edges of the substrate. Once cooled, a trim piece having the sections shown in FIGS. 3 and 4 is obtained. It may be that heating of the substrate is not necessary to obtain sufficient adhesion together of the PVC skin and extruded PVC, depending upon requirements.

An elongate trim piece obtainable by the above-mentioned process is shown in FIGS. 2 to 4. FIG. 2 shows the exterior of an upper part of car door panel 10 having first embodiment belt molding 12 installed along the top of the panel along a lower edge of a window opening to abut window glass 14.

Belt molding 12 includes roll-formed aluminum strip 16 having a generally "U"-shaped cross-section, which strip provides a relatively rigid core for polymeric portions of the molding. Extending from one end to the other of the molding is injection-molded thermoplastic skin 18. Formed unitarily with the skin are end caps 20. End cap 20r is located at the rear end of the elongate trim piece while cap 20f is located at the front end of the piece. The end caps and skin, as described in connection with the above process, are injection molded at the same time in the same mold from the same material and in this way are unitarily molded with each other. Further, the skin and caps of the preferred embodiment are molded so as to be seamless, there being no seams between the end caps and central portion of the strip visible once the molding is installed on a vehicle. The obverse face of the skin, that is the outwardly facing portion of the plastic skin and end caps thus serve to conceal the substrate, the end caps serving to conceal the ends of the substrate.

Rear face 19 of the skin abuts and is adhered to obverse face 21 of extruded PVC layer 22. Extruded layer 22 is adhesively bonded to a portion of the outwardly convex surface of outer leg 24 of installed molding 12. End caps or lips 20, located at longitudinal ends of the elongate skin, extend from the ends of the rear face of the skin and face each other. The core is located between the pair of end caps and edges 23 of the core are in abutment with the inner surfaces 25 of the end caps which face each other.

Paired opposing lips 27 run the length of the substrate. As with the pair of end caps, lips 27 extend rearwardly of the rear surface of the skin and face each other to be in abutment with corresponding edges 29 of the extruded PVC layer on core 16. Lips 27 are shaped so as to wrap behind the corresponding edge of the core.

In the disclosed embodiment, paired lips of the skin face each other and corresponding edges of the substrate are in abutment with the inner facing surfaces of the lips. The lips can thus be said to be shaped for engaging abutment with corresponding edges of the substrate. Given the tendency of paired lips to shrink toward each other once the skin and substrate are assembled, a snug fit of the skin to the substrate is provided. In the case of the end caps, each lip includes portion 31 directed axially inwardly of the end cap so as to define channel 33 for receipt of the edge of the substrate. Likewise, each of lips 27 turn slightly inwardly towards the center line of the trim piece to provide channel 35 for edges of the substrate. As shown, the lips of the disclosed embodiment are continuous and form a ridge which surrounds the rear face of the skin.

The fist leg of the "U"-shaped aluminum core presents a continuous obverse face for abutment and adhesion to the reverse face of the skin. The rear face of the skin and the obverse face of the leg of the substrate to which it is attached are closely matched to obtain satisfactory adhesion between the two surfaces. Application of pressure to the interface of the surfaces by application of pressure to the obverse face of the skin, by enhancing contact between the surfaces is also thought to enhance adhesive contact. A suitably shaped roller could be used for application of such pressure immediately after the substrate and skin are assembled. A roller having a central axis of rotation could have, for example, an outer concave axial cross-section (a planar section taken through its axis of rotation) shaped to match or complement the outer convex surface of the skin, as shown in FIG. 3 taking into account tapering of molding 12 from end to end.

Figure 5:
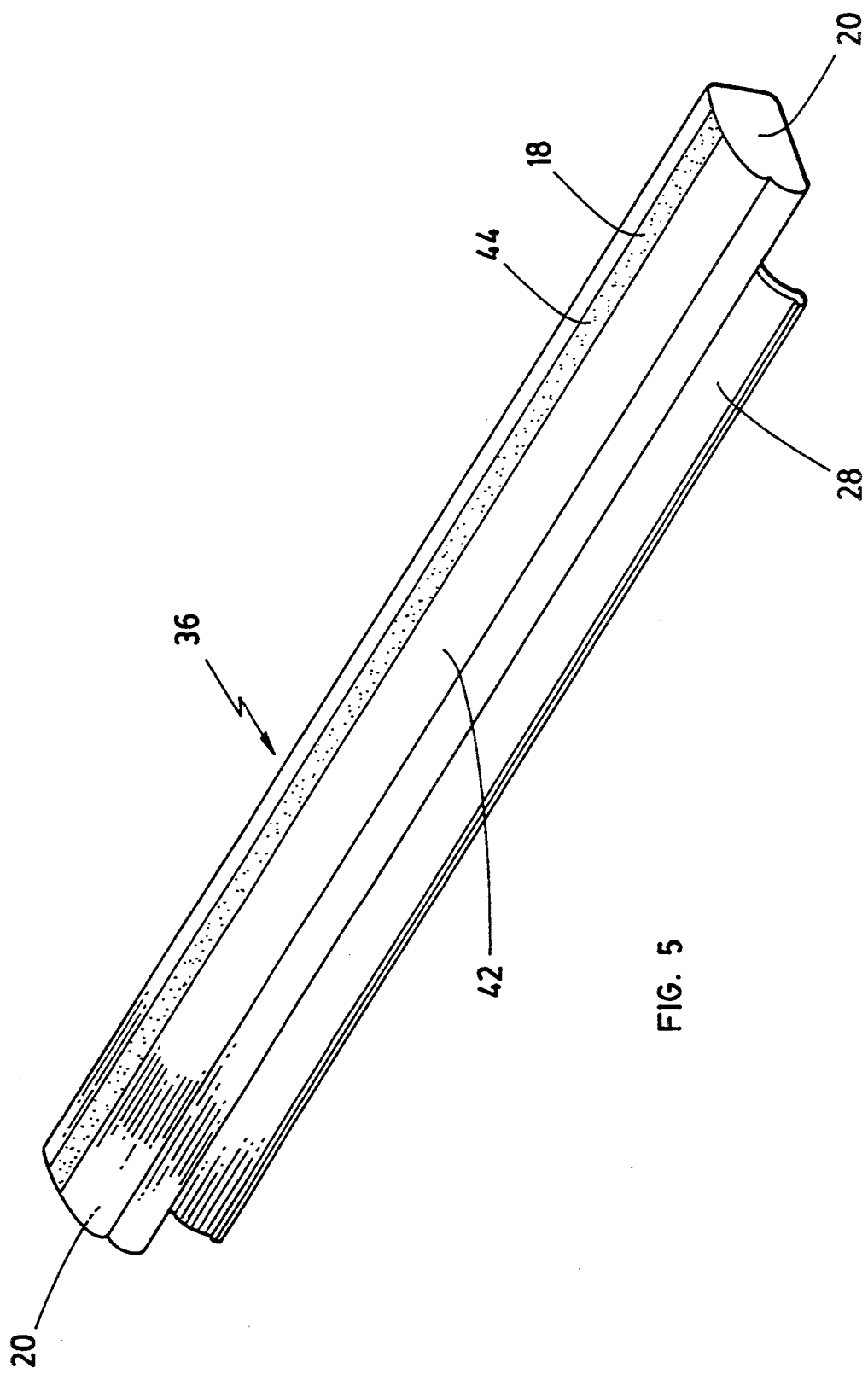
FIG. 5 is an isometric view of second preferred embodiment obtainable by the preferred process of the present invention.

The inner leg 26 of the strip has extruded onto it ethylene propylene diene monomer (EPDM) layer 28 having flocking 30 which abuts the window glass. As best seen in FIG. 2, first embodiment molding 12 is tapered, being of narrower cross-section at forward end 32 than at rearward end 4. Second embodiment molding 36, shown in FIG. 5, is similar to the first embodiment molding, but it is not tapered along its length. There is thus no crimping involved in the preparation of the substrate of this embodiment. The metal core of molding 36 is of constant cross-section along its length from one end to the other.

Skin 18 and end caps 20 may alternatively be of modified polypropylene, a blend of EPDM and polypropylene.

As seen in FIGS. 2 and 3, and described above, the skin of the disclosed embodiment has two pairs of opposing lips. Each lip is shaped to match the shape of the corresponding edge of the substrate with which it abuts.

In an alternative process, the step of extruding a thermoplastic layer is omitted. Rather, to the second area of the substrate is applied PVC adhesive A 1404 B, which is heat activatable. A substrate cut to length is heated to a temperature of about 50° C. and assembled with a suitably dimensioned and shaped skin partially cooled in its mold to a temperature of about 50° C., as in the case of the above-described process. In connection with the products of the processes disclosed, a trim piece having an underlying extruded layer to which is adhesively bonded the skin appears to be somewhat more resistant to delamination than a piece having a skin directly adhered to the metal core of the substrate.

PVC is a thermoplastic. As such, PVC has the property that it softens or becomes more malleable upon the application of heat. If enough heat is applied PVC becomes molten and may thus be molded to a desired shape, as described above for skin 18. Once shaped, as in an injection-molding process, a PVC piece will retain its shape upon cooling. As the temperature of the material decreases it becomes more rigid.

In the aforementioned process, freshly formed PVC skin 18 was described as being assembled with aluminum core 16, after being removed from its mold at about 50° C. but before further significant cooling has occured. In order for such assembly to proceed, that is for the PVC skin to be snapped onto the core, the PVC must be sufficiently elastic. If significant cooling takes place, say to room temperature for example, the PVC will be too rigid for such assembly to satisfactorily proceed. It is thus said that the assembly of the skin and substrate is carried out while the skin is relatively elastic.

The mold used in the process disclosed above is dimensioned such that the length between the inner facing surfaces 25 of the end caps matches (within a millimeter or so) the length of the substrate with which the skin is assembled. This distance, as it applies to a freshly formed skin, is herein referred to as the nominal distance between the inner surfaces of the lips. It has been found that if a molded skin of about one meter in length is left unassembled and allowed to cool to room temperature, the skin eventually shrinks along its length by about 2 centimeters. When a skin is assembled to a core before the occurrence of such shrinkage, as in the above-described process, the forces responsible for such shrinkage provide a snug fit of the skin to the core from end to end between the end caps. It may be found, depending upon the configuration of a particular piece being manufactured, necessary for the nominal distance between facing lips of a skin to be somewhat greater than the substrate with which the skin is to be assembled.

A PVC skin which has been removed from its mold and cooled and shrunk may be reheated to a relatively elastic state, but the skin does not recover its original length, that is the length it had when first removed from the mold. In the case of the skin used in the process disclosed herein it has been found, a skin once cooled and shrunk, even if reheated to be sufficiently elastic for assembly with a core, cannot be assembled because of its decreased length. It is therefore important that the skin and substrate be assembled, both when the skin is relatively elastic and prior to significant shrinkage. Significant shrinkage is thus any amount of shrinkage which is too great to prevent assembly of the substrate and skin.

As mentioned, the length of the substrate used in the foregoing example and the nominal distance between the inner surfaces of the lips are about the same as each other. It might turn out to be the case that the nominal distance can be greater than the length of the substrate, but because of sufficient shrinkage of the skin a satisfactorily snug fit of the skin and substrate is still obtained.

In the case of the disclosed embodiment, the underside of the skin is adhesively attached to the obverse face of one leg of the substrate. In the disclosed process, the substrate is at a temperature of about 50° C. at the time the skin and subtrate are assembled. The adhesive used in the example is a heat activatable adhesive and as such, it is thought that such heating of the substrate might enhance the adhesive bond between the abutting surfaces of the skin and substrate. It might turn out to be the case, however, that sufficiently strong adhesion is obtained due to the heat let off from the skin alone.

As a practical matter, the skin is generally cooled to the neighborhood of its assembly temperature in the mold in which it is formed. At least partial cooling of the skin to a semi-rigid, or at least non-molten state is necessary prior to removal of a plastic piece from its mold. Retention in the mold during cooling also ensures premature shrinkage of the skin prior to assembly onto a substrate.

An advantage obtainable through the present invention includes the use of multicavity molds. It is thought that up to as many four cavities and possibly more cavities can be readily included in a single molding block for simultaneous injection-molding of several skins.

What is claimed is:

1. A process for manufacture of an automotive trim piece having a substrate with a polymeric skin fastened thereto, the process comprising the steps of:
   applying an adhesive to an obverse face of the substrate for bonding the skin and the substrate of the trim piece together when assembled;
   molding the polymeric skin separately from the substrate from a molten polymer, the skin having a rear face for abutment with the obverse face of the substrate and a pair of lips extending from ends of the rear face of the skin, the lips facing each other for engaging abutment with corresponding edges of the substrate, wherein the polymer has the property that upon cooling to a relatively rigid state, the skin molded therefrom shrinks;
   partially cooling the skin to a non-molten and relatively elastic state;
   assembling the skin, while in the relatively elastic state, and the substrate together with the rear face of the skin and the obverse face of the substrate in abutting contact and with the edges of the substrate between the lips of the skin; and
   further cooling the skin, wherein the lips are located such that when further cooled, the skin lips in abutment with the corresponding edges of the substrate and shrinkage forces of the skin produce a snug fit from edge to edge of the skin to the substrate and the skin becomes relatively rigid.

2. The process of claim 1 wherein the polymeric skin is a thermoplastic and molding the polymeric skin includes the step of injecting a molten thermoplastic into a mold cavity and cooling of the skin prior to assembly of the skin and substrate is carried out while the skin is in the mold cavity.

3. The process of claim 2 wherein the skin is cooled to a temperature of about 50° C. while in the mold cavity.

4. The process of claim 1 wherein the trim piece is elongate, the edges of the substrate are at axial ends thereof, and the process further includes the step of preparing the substrate by cleaning the substrate.

5. The process of claim 4 wherein the substrate includes a metal core, the polymeric skin is a decorative layer for the core in which the lips comprise end caps shaped to conceal the core when the trim piece is installed on the vehicle, and the preparation step further includes rollforming the metal.

6. The process of claim 1, wherein the adhesive is heat activatable and the process further comprises the step of heating the substrate to activate the adhesive prior to the assembling step.

7. The process of claim 6, wherein the substrate is heated to at least about 50° C. prior to assembly of the skin and substrate.

8. The process of claim 1, further comprising the step of applying pressure to the trim piece to press the abutting faces of the assembled piece together to ensure adhesion therebetween.

9. The process of claim 1, wherein each lip includes a portion directed inwardly thereof to define a channel for receipt therein of a portion of the corresponding edge of the substrate.

10. The process of claim 1, wherein the trim piece is elongate, the substrate including first and second pairs of said edges, the edges of the first pair being at longitudinal ends of the substrate and edges the of the second pair running the length of the substrate, wherein the molding step includes shaping the skin so as to have a first pair of said skin lips corresponding with the first pair of substrate edges and a second pair of said skin lips corresponding with the second pair of substrate edges.

11. The process of claim 10, wherein the substrate includes a metal core and the process includes the further step of rollforming the metal to have a generally "U"-shaped cross-section such that said obverse face is continuous and is on a first leg of the "U" to extend between the first and second pairs of the substrate edges and wherein the skip is shaped to have the rear face in abutment with the obverse face of the first leg.

12. The process of claim 1, wherein the polymer is a thermoplastic selected from the group of polyvinyl chloride, polypropylene, modified polypropylene and thermoplastic elastomeric materials.

13. The process of claim 12, wherein the polymer is polyvinyl chloride.

14. The process of claim 13, wherein the process further includes the steps of extruding a thermosetting polymer onto an obverse face of a second leg of the "U", curing the thermosetting polymer, and cutting the substrate to length prior to the assembling step.

15. The process of claim 14, wherein the trim piece is a belt molding for installation on the exterior of a vehicle door along a lower edge of a window opening with an obverse face of the skin facing outwardly and the molding step includes injection-molding the polyvinyl chloride and the skin is shaped so as to conceal front and rear ends of the first leg of the core from view when the piece is installed on the vehicle door.

16. A process for manufacture of a belt molding for installation on the exterior of a vehicle door along a lower edge of a window opening, the process comprising the steps of:
rollforming a metal core to have a generally "U"-shaped cross-section for fitting to the car door with a first leg of the "U" facing outwardly;
applying a first activatable adhesive to an obverse face of the first leg for adhesively bonding a thermoplastic polymeric layer thereto;
activating the adhesive to ready the core for application of the polymeric layer to the first leg;
extruding the thermoplastic polymeric layer onto the obverse face of the first leg;
applying to the extruded layer an adhesive for bonding a skin of thermoplastic material thereto;
cutting the core to a predetermined length to form an elongate substrate for the belt molding;
molding a decorative skin of thermoplastic material in a mold separate from the substrate so as to have a rear face for abutment with the extruded thermoplastic polymeric layer of the substrate, and first and second pairs of lips extending rearwardly from the rear face of the skin, the first pair of lips being located at lengthwise ends of the skin and shaped for engaging abutment with corresponding ends of the substrate, the second pair of lips running from end to end of the skin and shaped for engaging abutment with corresponding edges of the substrate, wherein the thermoplastic material has the property that upon cooling to a relatively rigid state, the skin molded therefrom shrinks;
partially cooling the skin while in the mold to a non-molten and relatively elastic state;
removing the skin from the mold while the skin is in the relatively elastic state; assembling the skin in the relatively elastic state and the substrate together with the rear face of the skin and the adhesive applied to the extruded layer in contact with each other; and
wherein upon further cooling the skin shrinks with respect to the substrate to produce a snug fit of the substrate between the lips of the skin from end to end and from edge to edge of the substrate and the rear face of the skin is adhesively secured to the extruded layer of the substrate.

17. The process of claim 16, wherein the lips are shaped to form a continuous ridge surrounding the rear face of the skin and each lip of the second pair is shaped to wrap behind the corresponding edge of the first leg of the core.

18. The process of claim 16, wherein the first pair of lips comprises end caps shaped to conceal the core when the molding is installed on the vehicle.

19. The process of claim 16, wherein each lip of the first pair of lips further includes a channel for receipt therein of a portion of the corresponding end of the substrate.

20. The process of claim 16, further comprising the step of heating the substrate to a temperature of at least about 50° C. just prior to assembly of the skin and substrate.

21. The process of claim 16, further comprising the step of applying pressure to the molding to press skin and substrate together to ensure adhesion therebetween.

22. A process for manufacture of an automotive trim piece having a substrate with a polymeric skin fastened there,to, the process comprising the steps of:
preparing the substrate by applying an adhesive to a first area of a metal core for securing a polymeric material to the core;
extruding a layer of the polymeric material onto the first area of the core;
applying an adhesive to an obverse face of the extruded polymeric material, for adhering the skin to the extruded polymeric material when the trim piece is assembled;
cutting the core to length;
molding the polymeric skin, separately from the substrate from a molten polymer, the skin having a rear face for abutment with the adhesive of the obverse face of the extruded polymeric material, and a pair of lips extending from ends of the rear face of the skin, the lips facing each other for engaging abutment with corresponding edges of the substrate, wherein the polymer has the property that upon cooling to a relatively rigid state, the skin molded therefrom shrinks;

partially cooling the skin to a non-molten and relatively elastic state;

assembling the skin, while in the relatively elastic state, and the substrate together with the rear face of the skin and the obverse face of the extruded polymeric material having the adhesive applied thereto in abutting contact and with the edges of the substrate between the lips of the skin; and further cooling the skin, wherein the lips are located such that when further cooled, the skin lips in abutment with the corresponding edges of the substrate and shrinkage forces of the skin produce a snug fit from edge to edge of the skin to the substrate and the skin becomes relatively rigid.

23. The process of claim 22 wherein the polymeric skin is a thermoplastic and molding the polymeric skin includes the step of injecting a molten thermoplastic into a mold cavity and cooling of the skin prior to assembly of the skin and substrate is carried out while the skin is in the mold cavity.

24. The process of claim 23 wherein the skin is cooled to a temperature of about 50° C. while in the mold cavity.

25. The process of claim 22 wherein the trim piece is elongate, the edges of the substrate are at axial ends thereof, and the step of preparing the substrate includes cleaning the substrate.

26. The process of claim 25 wherein the polymeric skin is a decorative layer for the core in which the lips comprise end caps shaped to conceal the core when the trim piece is installed on the vehicle, and the preparation step further includes rollforming the metal core.

27. The process of claim 22, further comprising the step of applying pressure to the trim piece to press the abutting faces of the assembled piece together to ensure adhesion therebetween.

28. The process of claim 22, wherein each lip includes a portion directed inwardly thereof to define a channel for receipt therein of a portion of the corresponding edge of the substrate.

29. The process of claim 22, wherein the trim piece is elongate, the substrate including first and second pairs of said edges, the edges of the first pair being at longitudinal ends of the substrate and edges the of the second pair running the length of the substrate, wherein the molding step includes shaping the skin so as to have a first pair of said skin lips corresponding with the first pair of substrate edges and a second pair of said skin lips corresponding with the second pair of substrate edges.

30. The process of claim 29, including the further step of rollforming the metal to have a generally "U"-shaped cross-section such that said obverse face is continuous and is on a first leg of the "U" to extend between the first and second pairs of the substrate edges and Wherein the skin is shaped to have the rear face in abutment with the obverse face of the first leg.

31. The process of claim 30, wherein the polymer is a thermoplastic selected from the group of polyvinyl chloride, polypropylene, modified polypropylene and thermoplastic elastomeric materials.

32. The process of claim 31, wherein the polymer is polyvinyl chloride.

33. The process of claim 32, wherein the process further includes the steps of extruding a thermosetting polymer onto an obverse face of a second leg of the "U" and curing the thermosetting polymer.

34. The process of claim 33, wherein the trim piece is a belt molding for installation on the exterior of a vehicle door along a lower edge of a window opening with an obverse face of the skin facing outwardly and the molding step includes injection-molding the polyvinyl chloride and the skin is shaped so as to conceal front and rear ends of the first leg of the core from view when the piece is installed on the vehicle door.

* * * * *